United States Patent [19]

Matsushima et al.

[11] Patent Number: 4,640,184
[45] Date of Patent: Feb. 3, 1987

[54] MOUNTING STRUCTURE FOR A ROOF DUCT

[75] Inventors: Katsuaki Matsushima; Yasuhiro Fujioka; Takeshi Sasaki; Manabu Fujine; Kouji Yamamoto, all of Toyota, Japan

[73] Assignee: Toyota Jidosha Kabushiki Kaisha, Japan

[21] Appl. No.: 690,122

[22] Filed: Jan. 10, 1985

[30] Foreign Application Priority Data

May 7, 1984 [JP] Japan .......................... 59-66175[U]

[51] Int. Cl.$^4$ .............................................. B60H 1/28
[52] U.S. Cl. ...................................... 98/2.15; 98/2; 98/9; 98/40.19
[58] Field of Search ............... 98/2.15, 2.14, 2, 40.19; 62/244

[56] References Cited

U.S. PATENT DOCUMENTS

| | | | |
|---|---|---|---|
| 2,720,149 | 10/1955 | Groene | 98/2.15 |
| 2,775,185 | 12/1956 | Ahrens | 98/9 |
| 2,937,047 | 5/1960 | Hezler, Jr. et al. | 98/2.15 |
| 3,355,210 | 11/1967 | Cripe | 98/2 |
| 3,577,903 | 5/1971 | Eggert, Jr. | 98/2 |
| 4,252,053 | 2/1981 | Muto et al. | 98/2.15 |
| 4,332,187 | 6/1982 | Imai et al. | 98/2 |
| 4,432,213 | 2/1984 | Katahira et al. | 98/2.15 |

Primary Examiner—Henry C. Yuen
Attorney, Agent, or Firm—Finnegan, Henderson, Farabow, Garrett & Dunner

[57] ABSTRACT

A mounting structure of a roof duct in an air conditioner which comprises a top surface of the roof duct having an air diffuser and formed with a grooved recess along the longitudinal direction of the roof duct, a trough-shaped reinforcement mounted at both ends thereof on an automotive body engaged with the grooved recess, a swelled part partly swelled on the bottom of the reinforcement and formed on the bottom in reverse direction to the grooved recess, and a wire harness connected to a control switch and inserted into the space formed between the bottom of the grooved recess and the swelled part of the reinforcement. Thus, this mounting structure can obtain a passage of a wire harness out of the roof duct, thereby reducing the resistance of ventilation of air through the roof duct. Further, this mounting structure can use a reinforcement as a fixture of a wire harness and a protector, thereby reducing the abnormal noise from the roof duct, can reduce the number and weight of components to be mounted in the roof duct and can facilitate the mounting of the roof duct on the roof.

1 Claim, 7 Drawing Figures

MOUNTING STRUCTURE FOR A ROOF DUCT

BACKGROUND OF THE INVENTION

The present invention relates to a mounting structure of a roof duct having a diffuser of a cooling unit disposed at the rearmost of a compartment and arranged at a ceiling of the compartment in a cooler for cooling the rear seat in a vehicle.

In a rear cooler for cooling the rear seat of a vehicle of the structure that a cooling unit is mounted at the rearmost of a compartment and a duct having a diffuser is disposed at a ceiling of the compartment. As disclosed in Japanese Utility Model Laid-open No. 150258/79, a duct is passed through a side trim and a center pillar for coupling the cooling unit to a roof duct. This structure cannot increase the sectional area of the duct and flow of cooling air is poor. Therefore, its cooling capacity is insufficient, and reinforcement A is bridged over the ceiling in the compartment as shown in FIG. 5 as means for mounting the roof duct on the ceiling in the compartment, both ends of the reinforcement are fastened to the body via bolts B, and the roof duct D is clamped by screws E to a bracket C provided at the reinforcement A. The reinforcement A has large shape and is not only disadvantageous in weight, but is also limited in the mounting position of the roof duct D and the shape of the duct D itself. Another disadvantage is that the number of components increases. Control components, such as a wire harness G of a switch F, is passed through the duct D, thereby causing the resistance in the ventilation of air and the production of abnormal noise.

SUMMARY OF THE INVENTION

An object of the present invention is to provided a mounting structure of a roof duct having a diffuser in a cooling unit disposed in the rearmost of a compartment which can eliminate the above-described drawbacks and disadvantages of the conventional mounting structure of a roof duct and can obtain a passage of a wire harness out of the roof duct, thereby reducing the resistance of ventilation of air through the roof duct.

Another object of the present invention is to provide a mounting structure of a roof duct of a cooling unit which can use a reinforcement, such as a fixture of a wire harness and a protector, thereby reducing the abnormal noise from the roof duct and the number and weight of components to be mounted in the roof duct, while facilitating the mounting of the roof duct on the roof.

Still another object of the invention is to provide a mounting structure of a roof duct of a cooling unit in which a half duct is mounted at another position with a support bracket, and able to commonly use the roof duct by mounting the support bracket on the body side and clamping the roof duct and the reinforcement with bolts for several types of vehicles.

According to the present invention, there is provided a mounting structure for a roof duct of an air conditioner which comprises a top surface of the roof duct having an air diffuser and formed with a grooved recess along the longitudinal direction of the roof duct, a trough-shaped reinforcement mounted at both ends thereof on an automotive body engaged with the grooved recess, a swelled part partly swelled on the bottom of the reinforcement and formed on the bottom in reverse direction to the grooved recess, and a wire harness connected to a control switch and inserted into the space formed between the bottom of the groove recess and the swelled part of the reinforcement. Thus, this mounting structure enables passage of a wire harness out of the roof duct, thereby reducing the resistance of ventilation from air through the roof duct. Further, this mounting structure may include a reinforcement as a fixture of a wire harness and a protector, thereby reducing any abnormal noise from the roof duct, as well as the number and weight of components to be mounted in the roof duct. This reinforcement also facilitates the mounting of the roof duct on the roof. Further, this mounting can mount a half duct at another position with a support bracket, while commonly supporting the roof duct by mounting the support bracket on the body side of the cooling unit and clamping the roof duct and the reinforcement with bolts for several types of vehicles.

The above and other related objects and features will become more apparent from the following description of the preferred embodiments of the present invention when read in connection with the accompanying drawings.

DESCRIPTION OF THE PREFERRED EMBODIMENTS

The present invention will now be described in more detail with reference to the accompanying drawings.

Figure 1A:
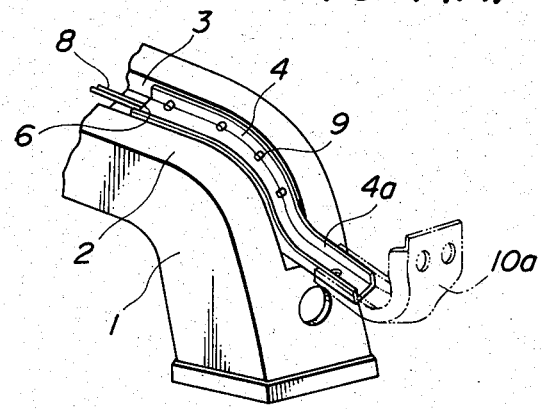
FIGS. 1(A) and 1(B) are perspective views of an embodiment of a roof duct of the mounting structure at both ends of a roof duct constructed according to the present invention.
Figure 1B:
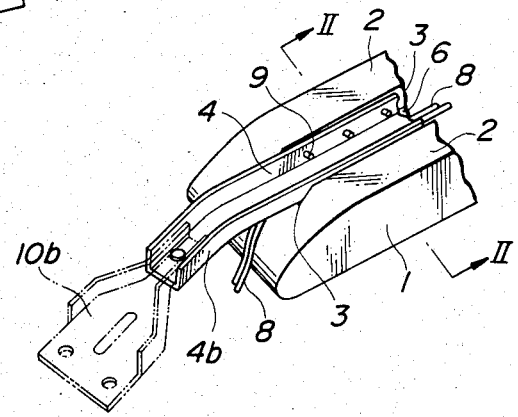
Figure 2:
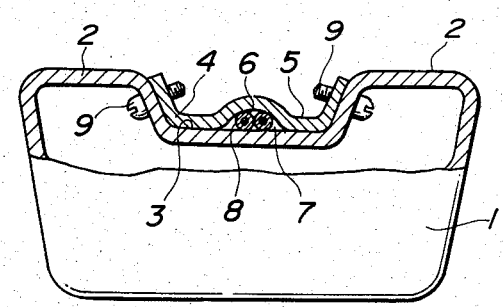
FIG. 2 is an enlarged partial sectional view, taken along the line II—II in FIG. 1(B)

FIGS. 1(A) and 1(B) show an embodiment of a mounting structure of a roof duct constructed according to the present invention, wherein FIG. 1(A) is a perspective view of the end of the roof duct at the cooling unit side FIG. 1(B) is a perspective view of the end of the roof duct opposite the cooling unit side, FIG. 2 is an enlarged partial sectional view, taken along the line II—II in FIG. 1(B).

A roof duct 1 is formed longitudinally along the roof of the vehicle (not shown) and includes a first grooved recess 3 on the top surface 2 as shown in FIG. 2. A second grooved recess 6 is formed substantially within and in the opposite direction of the first recess 3 along the center of the bottom member 5 of a trough-shaped reinforcement 4. This reinforcement 4 is engaged with the recess 3, so that a wire harness 8 may be inserted into a space 7 formed between the bottom of the first recess 3 and the second grooved recess 6 of the reinforcement 4. The roof duct 1 and the reinforcement 4 are clamped together by screws 9 or rivets.

The reinforcements 4 are provided, as shown in FIGS. 1(A) and 1(B), in the first recesses 3 at both ends of the roof duct 1. Support brackets 10a and 10b which are fastened in advance to an automotive body side are respectively mounted at an angle adapted for individually mounting on the mounting ends 4a and 4b to the body side via bolts and nuts.

Figure 3A:
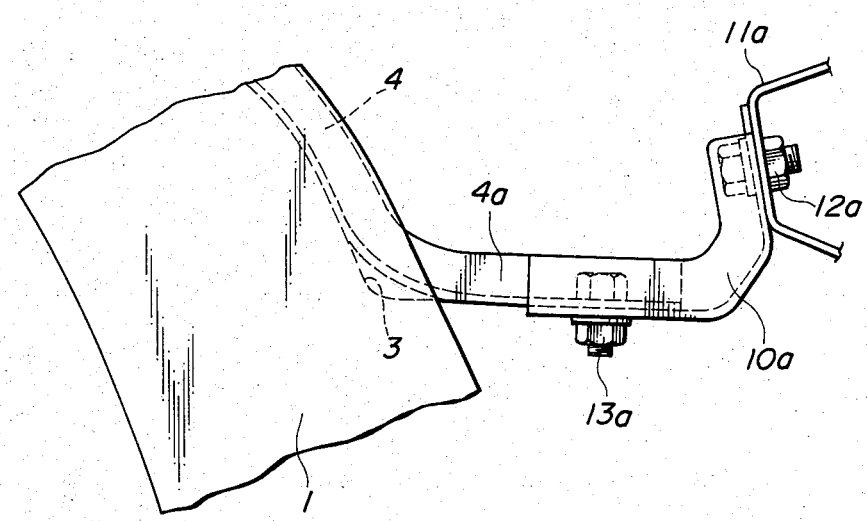
FIGS. 3(A) and 3(B) are perspective views of structure for mounting the roof duct on a body of a vehicle.
Figure 3B:
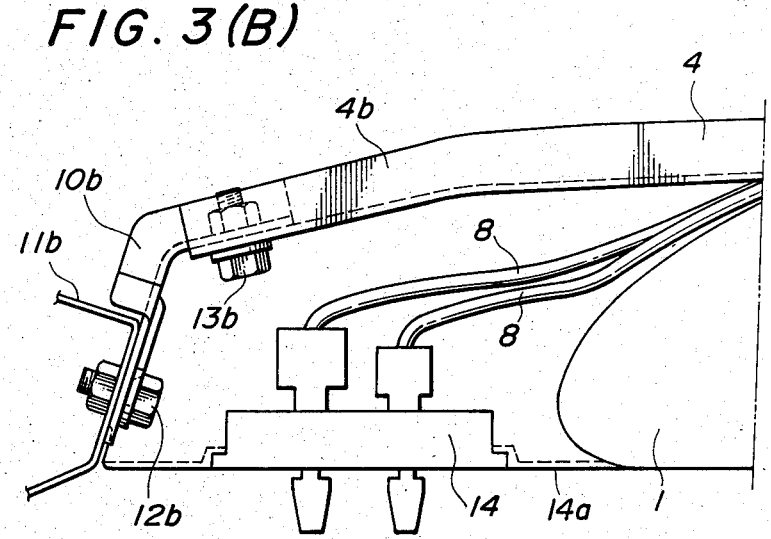

FIGS. 3(A) and 3(B) are side views of means for mounting the roof duct 1 on the body, wherein FIG. 3(A) shows the inlet side of the cooling air of the roof duct 1, and FIG. 3(B) shows the end of the roof duct 1.

The ends 4a, 4b of the reinforcement 4 are respectively clamped to the sub brackets 10a and 10b fastened in advance by bolts and nuts 12a, 12b to the corresponding reinforcements 11a and 11b of the body side via bolts and nuts 13a, 13b to the ceiling of the compartment of a vehicle, and a control switch 14 interlocked to a wire harness 8 is provided in the space at the end of the roof duct 1 and mounted on a support plate 14a.

Figure 4:
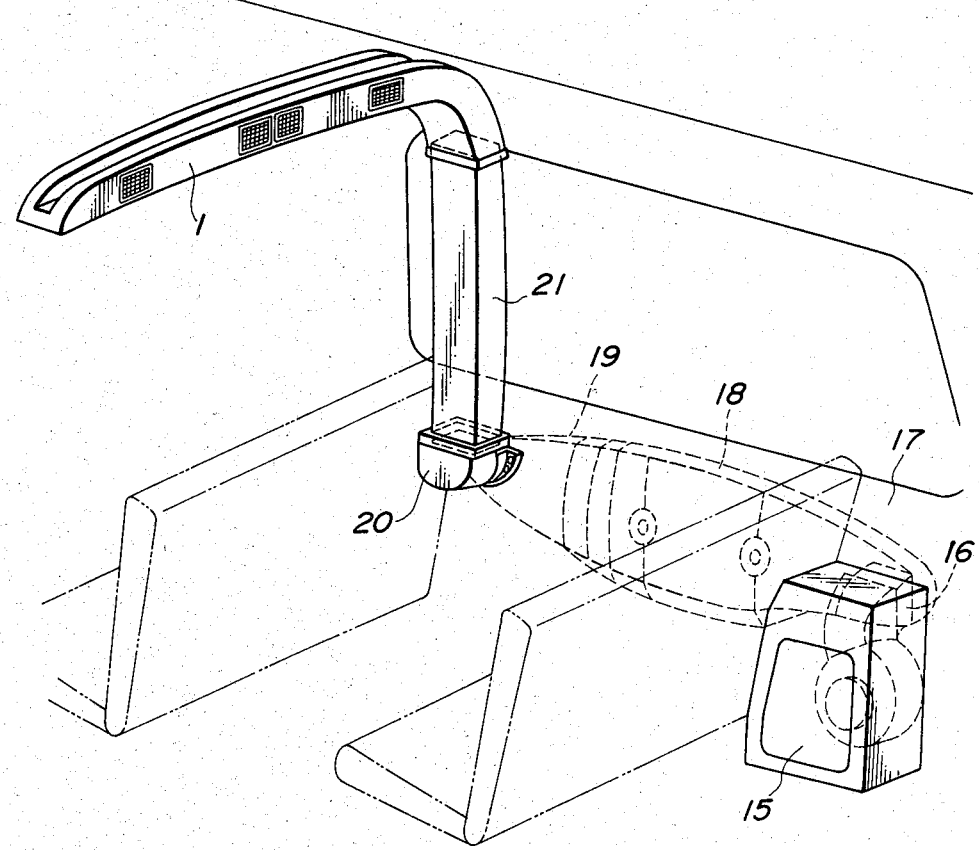
FIG. 4 is a schematic view showing the cooling air system of the roof duct.
Figure 5:
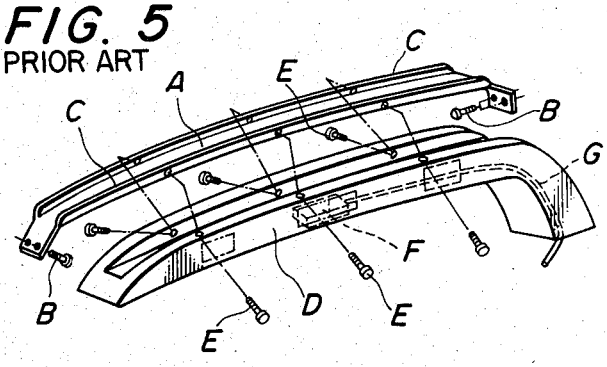
FIG. 5 is an exploded perspective view of the mounting structure of the conventional roof duct.

FIG. 4 shows a cooling air system to the roof duct 1. Reference numeral 15 designates a cooling unit installed at the rearmost of the compartment, which unit contains a heat exchanger and a blower motor. Cooling air diffused from the cooling unit 15 is introduced through a duct 16 into a side trim 17, fed forwardly of the vehicle via ducts 18, 19 connected to the duct 16. The end of the duct 19 is connected to a duct 20 provided at the position corresponding to the inlet of the cooling air of the roof duct 1, thereby returning the cooling air again into the compartment. Further, the cooling air is fed to the ceiling via the duct 21 connected to the duct 20 and the roof duct 1 and diffused into the compartment.

What is claimed is:

1. A detachable ventilation apparatus along a vehicle surface capable of housing conductor cables for operating the ventilation apparatus which comprises:

conduit means for conveying air within the vehicle, said conduit means including a substantially enclosed duct having an elongated groove extending along a substantial portion of the length of an outer surface of said duct, said duct including means for diffusing the conveyed air into the vehicle;

support means extending within said elongated groove and projecting out of opposite ends thereof for supporting said conduit means and having a first end section and a second end section, said support means including a reinforcement plate and securing means for securing said conduit means to said reinforcement plate, said reinforcement plate and said outer surface defining a channel therebetween within said elongated groove for receiving the conductor cables;

bracket means affixed to said first and second end sections for removably mounting said support means and said conduit means within the vehicle, said bracket means being mounted to the vehicle to align said outer surface to abut an interior portion of the vehicle, thereby substantially concealing said elongated groove, said bracket means including a first bracket and a second bracket, said first bracket being affixed to said first end section and said second bracket being affixed to said second end section, said first bracket including an upward extension and defining a trough between said duct and said upward extension, said second bracket including a downward extension and defining a gap beneath said second end section and between said duct and said downward extension;

a support plate mounted within said gap; and switching means for controlling the electrical operation of the conductor cables, wherein said support plate provides support for said switching means.

* * * * *